(12) United States Patent
Zheng et al.

(10) Patent No.: US 9,011,970 B2
(45) Date of Patent: Apr. 21, 2015

(54) PROCESS FOR PREPARING ARTICLES HAVING ANTI-FOG LAYER BY LAYER COATING AND COATED ARTICLES HAVING ENHANCED ANTI-FOG AND DURABILITY PROPERTIES

(75) Inventors: Haipeng Zheng, Pinellas Park, FL (US); Michael Rubner, Westford, MA (US); Nuerxiati Nueraji, Brooklyn, NY (US); Robert E. Cohen, Jamaica Plain, MA (US)

(73) Assignee: Essilor International, Charenton le Pont (FR)

( * ) Notice: Subject to any disclaimer, the term of this patent is extended or adjusted under 35 U.S.C. 154(b) by 442 days.

(21) Appl. No.: 12/847,808

(22) Filed: Jul. 30, 2010

(65) Prior Publication Data

US 2012/0027933 A1 Feb. 2, 2012

(51) Int. Cl.
- *B05D 5/10* (2006.01)
- *G02B 27/00* (2006.01)
- *B05D 5/06* (2006.01)
- *C09D 5/16* (2006.01)
- *C03C 17/34* (2006.01)
- *C09D 7/12* (2006.01)
- *C08K 3/36* (2006.01)
- *C08K 9/04* (2006.01)

(52) U.S. Cl.
CPC ............ *C09D 5/1693* (2013.01); *B05D 5/10* (2013.01); *C03C 17/3405* (2013.01); *C09D 7/1225* (2013.01); *G02B 1/115* (2013.01); *G02B 27/0006* (2013.01); *C08K 3/36* (2013.01); *C08K 9/04* (2013.01)

(58) Field of Classification Search
CPC ................ B05D 5/10; G02B 27/006
USPC ........................................... 427/164
See application file for complete search history.

(56) References Cited

U.S. PATENT DOCUMENTS

| | | | |
|---|---|---|---|
| 5,126,208 A | 6/1992 | Larson | 428/425.2 |
| 5,363,994 A | 11/1994 | Angeline | 222/529 |
| 6,180,244 B1 | 1/2001 | Rayner et al. | 428/424.8 |
| 6,284,360 B1 | 9/2001 | Johnson et al. | 428/317.7 |
| 6,372,827 B2 | 4/2002 | Johnson et al. | 523/467 |
| 6,406,782 B2 | 6/2002 | Johnson et al. | 428/317.7 |
| 7,217,756 B2 | 5/2007 | Hu et al. | 524/445 |
| 2004/0158090 A1* | 8/2004 | Krafczyk et al. | 556/457 |
| 2007/0104922 A1 | 5/2007 | Zhai et al. | 428/41 |
| 2007/0129792 A1* | 6/2007 | Picart et al. | 623/1.46 |
| 2008/0038458 A1 | 2/2008 | Gemici et al. | 427/180 |
| 2008/0064832 A1 | 3/2008 | Deruelle et al. | 525/477 |
| 2009/0283926 A1* | 11/2009 | Chiu et al. | 264/1.32 |
| 2009/0324910 A1* | 12/2009 | Gemici et al. | 428/212 |
| 2012/0088106 A1* | 4/2012 | Jing et al. | 428/426 |

FOREIGN PATENT DOCUMENTS

| | | |
|---|---|---|
| WO | WO 96/41215 | 12/1996 |
| WO | WO 2007/056427 | 5/2007 |
| WO | WO 2008131152 A2 * | 10/2008 |

OTHER PUBLICATIONS

Howarter et al., Optimization of Silica Silanization by 3-Aminopropyltriethoxysilane, Langmuir 2006, 22, 11142-11147.*

Naviroj et al., Structure and Adsorption Characteristics of Silane Coupling Agents on Silica and E-glass Fiber; Dependence on pH, Technical Report No. 5, Govt Accession No. AD-A115293, pp. 1-34, Jun. 1982.*

Arkles, B., "Tailoring surfaces with silanes", Chemtech, vol. 7, p. 766, 1977.*

PCT International Search Report and Written Opinion issued in International Application No. PCT/EP2011/062980, dated Oct. 5, 2011.

Arkles et al., "Factors contributing to the stability of alkoxysilanes in aqueous solution," *J. Adh. Sci. Tech.*, 6(1):91-104, 1992.

Gemici et al., "Hydrothermal treatment of nanoparticle thin films for enhanced mechanical durability," *Langmuir*, 25:2168-2177, 2008.

* cited by examiner

*Primary Examiner* — Michael Cleveland
*Assistant Examiner* — James M Mellott
(74) *Attorney, Agent, or Firm* — Norton Rose Fulbright US LLP

(57) ABSTRACT

A process for making an article having anti-fog properties.

21 Claims, No Drawings

PROCESS FOR PREPARING ARTICLES HAVING ANTI-FOG LAYER BY LAYER COATING AND COATED ARTICLES HAVING ENHANCED ANTI-FOG AND DURABILITY PROPERTIES

BACKGROUND OF THE INVENTION

1. Field of the Invention

This invention relates to a process for preparing an article bearing an anti-fog layer-by-layer coating and to the articles bearing an anti-fog layer-by layer coating obtained by said process, more particularly optical and ophthalmic articles, especially ophthalmic lenses for eyeglasses.

The invention is based on the use of a specific intermediate layer enhancing the adhesion of said anti-fog layer-by-layer coating, in particular on metal oxide and silicon oxide layers usually formed by vacuum deposition.

2. Description of Related Art

It is known in the art that a layer-by-layer (LbL) coating can be assembled on a substrate from species having opposite charges, typically positively and negatively charged polyelectrolytes can be alternately deposited on a substrate.

In a general manner, at least two different polyelectrolyte solutions having opposite charges, or a polyelectrolyte solution and a nanoparticle solution having opposite charges, may be used to form the LbL coating.

As known in the art, a polyelectrolyte may be a polymer having a substantial portion of its repeating units bearing an electrolyte group. These groups are ionic or ionizable groups, especially in aqueous solutions.

Other known LbL coatings include a plurality of bilayers alternately comprising oppositely charged nanoparticles.

By selecting the materials of the layers and the deposition process conditions, such films can be anti-reflective, hydrophilic or superhydrophilic, hydrophobic or superhydrophobic.

LbL coatings having hydrophilic properties may also have anti-fog properties.

US 2007/0104922 describes superhydrophilic LbL coatings that can be anti-reflective and anti-fog, such as poly(allylamine hydrochloride)/$SiO_2$ LbL coatings.

A disadvantage of the anti-fog LbL coatings is that such coatings exhibit generally poor mechanical properties, especially poor adhesion, i.a. to mineral substrates and to metal oxides and silicone oxides layers. Mechanical properties of LbL coatings have been increased by calcination treatment, generally at high temperature (typically 550° C.).

A disadvantage associated to this technique is that it cannot be applied on any organic substrates and is only adapted to substrates that can withstand high temperature like glass substrates.

In the article "Hydrothermal Treatment of Nanoparticle Thin Films for Enhanced Mechanical Durability" Z. Gemici et al, Langmuir 2008, 24, 2168-2177, a hydrothermal treatment implemented at around 125° C., of different LbL coatings is described in order to improve mechanical durability of these coatings and avoid delamination, especially on a polycarbonate (PC) substrate.

A typical example of a LbL coating is either a polymer-nanoparticle coating made alternatively from a positively charged poly(diallyldimethyl ammonium chloride) and negatively charged silica nanoparticles, or an all-nanoparticle coating assembled alternatively from positively charged 3-aminopropyl silane modified silica (or titania) nanoparticles and negatively charged silica nanoparticles. After a hydrothermal treatment, such LbL coating has improved abrasion resistance.

US 2008/0038458 describes a hydrothermal calcination of $TiO_2$/$SiO_2$ LbL coatings, typically at a pressure in the range of 10 psi to 30 psi at temperature less than 500° C.

One disadvantage of the technique, along with the necessity of using an autoclave, is that the hydrothermal treatment affects the anti-fog properties of the coating, as explained in US 2008/0038458 paragraph [0046]: the coating can lose its anti-fog properties.

Consequently, it is desirable to provide a new and simple process of preparation of anti-fog LbL coatings having good or improved anti-fog properties, along with good mechanical properties such as improved adhesion to the substrate and/or improved abrasion resistance.

The adhesive function of water-borne silanes has been reported in several publications and in particular in the article "Factors contributing to the stability of alkoxysilanes in aqueous solution", B. Ahles, J. R. Steimmetz, J. Zazyczny and P. Metha, J. Adh. Sci. Tech. 6, (1), 193, 1992. Mention of Hydrosil™ materials was made in several patents, namely U.S. Pat. Nos. 7,217,756; 6,180,244; 6,406,782; 6,372,827; 5,363,994; and 6,284,360.

There is no disclosure of the use of aminosiloxane water-bone primers in combination with an anti-fog LbL coating as the polymeric coating and no disclosure that such kind of materials can improve the mechanical properties of a LbL system without impairing the anti-fog properties of the system.

SUMMARY OF THE INVENTION

An object of the invention is to improve the mechanical durability of anti-fog LbL coatings, especially adhesion properties, for a wide range of substrates and to metal oxides and silicon oxides layers while maintaining good anti-fog properties and keeping the deposition process of such anti-fog LbL coating as simple as possible.

A further object of the invention is to provide an anti-fog LbL coating having the improved mechanical properties mentioned above without concurrently decreasing its optical transparency in the visible range.

The present invention discloses that the adhesion properties of a LbL coating are improved by using a specific process for preparing an article having anti-fog properties, comprising:

(i) providing a substrate having at least one main surface bearing hydroxyl groups coated with an intermediate layer obtained by applying on said main surface of the substrate an intermediate layer composition comprising at least one hydroxylated and amino-functionalized siloxane oligomer; and (ii) forming on said intermediate coating an anti-fog LbL coating consisting of at least two bilayers obtained by:

(a) forming a first layer on the intermediate coating by applying a first composition comprising a polyelectrolyte obtained from carboxyalkyl cellulose or a polyelectrolyte obtained from polyacrylic acid (PAA), poly(methacrylic acid) (PMAA), PAA copolymer, PMAA copolymer, or mixtures thereof, preferably polyacrylic acid, (b) forming a second layer on the first layer by applying a second composition comprising a polyelectrolyte obtained from a polysaccharide including glucosamine units when the first layer comprises a polyelectrolyte obtained from carboxyalkyl cellulose or metal oxide or silicon oxide nanoparticles which are surface functionalized with amine groups when the first layer comprises the polyelectrolyte obtained from polyacrylic acid, poly(methacrylic acid), PAA copolymer, PMAA copolymer or mixtures thereof, (c) optionally repeating at least once steps (a) and (b); and (d) crosslinking the layers of the LbL coating by treatment with a composition of a coupling agent inducing chemical linkages between $NH_2$ and COOH groups, said crosslinking being performed either after step (b) or step (c).

The invention also relates to an optical article comprising a substrate having an antifog LbL coating obtainable by implementing the above described process.

In one embodiment of the invention, the intermediate layer composition is an aqueous composition and preferably the hydroxylated and amino-functionalized siloxane oligomer is linear and comprises 1 to 50, preferably 2 to 20, more preferably 4 to 15 siloxane units.

The intermediate layer of the invention improves the adhesion between a substrate and the anti-fog LbL coating, but also improves or maintains the anti-fog performance of LbL coating.

In a preferred embodiment the LbL coating constitutes the outermost layer or part of the outermost layer of an anti-reflecting multilayered coating, typically a low refractive index layer.

Other objects, features and advantages of the present invention will become apparent from the following detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question, and (c) need not cover that side completely.

As used herein, the phrase "last layer" means a monolayer or a multilayer which is in contact with the environmental air.

As used herein, the phrase "outermost coating" or "outermost layer" means a coating or a layer which is the farthest from the substrate and conversely the phrase "innermost coating" or "innermost layer" means a coating or a layer which is the closest to the substrate.

As used herein, the term "substrate" means a naked substrate or a naked substrate already coated with one or several functional coatings.

The optical article prepared according to the present invention is a transparent optical article, preferably a lens or lens blank, and more preferably an ophthalmic lens or lens blank. The optical article may be coated on its convex main side (front side (Cx)), concave (Cc) main side (back side), or both sides using the process of the invention.

Herein, the term "lens" means an organic or inorganic glass lens, comprising a lens substrate which may be coated with one or more coatings of various natures.

The lens naked substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, polyepoxides, polyepisulfides, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate) polymers, in particular substrates made of polycarbonate.

The surface of the article onto which the intermediate coating will be applied may optionally be subjected to a pre-treatment step intended to improve adhesion, for example a high-frequency discharge plasma treatment, a glow discharge plasma treatment, a corona treatment, an electron beam treatment, an ion beam treatment, an acid or base treatment.

The intermediate layer of the invention may be deposited onto a naked substrate or onto the outermost coating layer of the substrate if the substrate is coated with at least one surface coating. Said at least one surface coating may be, without limitation, an impact-resistant coating (impact resistant primer), an abrasion and/or scratch resistant coating, a polarized coating, a photochromic coating, a dyed coating, an anti-reflecting or a partial anti-reflecting coating. Preferably, the intermediate coating of the invention is applied on the outermost layer of an anti-reflecting or partial anti-reflecting coating.

The impact-resistant coating which may be used in the present invention can be any coating typically used for improving impact resistance of a finished optical article. This coating generally enhances adhesion of the abrasion and/or scratch-resistant coating on the substrate of the finished optical article. By definition, an impact-resistant primer coating is a coating which improves the impact resistance of the finished optical article as compared with the same optical article but without the impact-resistant primer coating.

Typical impact-resistance primer coatings are (meth) acrylic based coatings and polyurethane based coatings, in particular coatings made from a latex composition such as a poly(meth)acrylic latex, a polyurethane latex or a polyester latex.

Polyurethane-polyester latexes are commercially available from ZENECA RESINS under the trade name Neorez® (e.g., Neorez® R-962, Neorez® R-972, Neorez® R-986, Neorez® R-9603) or BAXENDEN CHEMICALS, a subsidiary of WITCO Corporation, under the trade name Witcobond® (e.g., Witcobond® 232, Witcobond® 234, Witcobond® 240, Witcobond® 242).

The abrasion- and/or scratch-resistant coating which may be used in the present invention can be any coating typically used for improving abrasion- and/or scratch-resistance of a finished optical article as compared to a same optical article but without the abrasion- and/or scratch-resistant coating.

Preferred abrasion- and/or scratch-resistant coatings are (meth)acrylate based coatings and silicon-containing coatings. The latter are more preferred and are disclosed, for example, in French patent application FR 2702486, which is incorporated herein by reference.

The anti-reflective coating which may be used in the invention can be any well known anti-reflective coating, typically a stack of high refractive (HI) and low refractive (LI) index layers.

The refractive indices are measured by using an infrared ellipsometer at 634 nm. This method is disclosed in A. BRUNET-BRUNEAU, S. FISSON, G. VUYE, J. RIVORY, J. Appl. Phys. 2000, 87, 7303-7309, and A. BRUNET-BRUNEAU, S. FISSON, B. GALLAS, G. VUYE, J. RIVORY, Thin Solid Films 2000, 377, 57-61.

As used herein, a low refractive index layer is intended to mean a layer with a refractive index n of 1.55 or less, preferably lower than 1.50 and even better lower than 1.45, and a high refractive index layer is intended to mean a layer with a refractive index n higher than 1.55, preferably higher than 1.6, more preferably higher than 1.8 and even better higher than 2.

HI layers are classical high refractive index layers and may comprise, without limitation, one or more mineral oxides such as $TiO_2$, $PrTiO_3$, $LaTiO_3$, $ZrO_2$, $Ta_2O_5$, $Y_2O_3$, $Ce_2O_3$, $La_2O_3$, $Dy_2O_5$, $Nd_2O_5$, $HfO_2$, $Sc_2O_3$, $Pr_2O_3$ or $Al_2O_3$, or $Si_3N_4$, as well as mixtures thereof, preferably $ZrO_2$, $TiO_2$ or $PrTiO_3$. HI layers may optionally contain low refractive index materials such as $SiO_2$. Obviously, mixtures of those compounds are such that the refractive index of the resulting layer is as defined above (higher than 1.55).

LI layers are also well known and may comprise, without limitation, $SiO_2$, $SiOx$ with $1 \leq x < 2$, $MgF_2$, $ZrF_4$, $Al_2O_3$, $AlF_3$, chiolite ($Na_5Al_3F_{14}$]), cryolite ($Na_3AlF_6$), or mixtures thereof, preferably $SiO_2$ or $SiO_2$ doped with $Al_2O_3$ which contributes to raising the critical temperature of the stack. Obviously, mixtures of those compounds are such that the refractive index of the resulting layer is as defined above (lower than or equal to 1.55). When $SiO_2/Al_2O_3$ mixtures are used, the LI layer preferably contains from 1 to 10%, more preferably from 1 to 8% by weight of $Al_2O_3$ relative to the total weight of $SiO_2+Al_2O_3$ in said layer. A too high amount of alumina is detrimental to the adhesion of the AR coating.

For example, $SiO_2$ doped with 4% or less $Al_2O_3$ by weight, or $SiO_2$ doped with 8% $Al_2O_3$ by weight may be employed. Commercially available $SiO_2/Al_2O_3$ mixtures can also be employed, such as LIMA® supplied by Umicore Materials AG (refractive index n=1.48 at 550 nm), or substance L5® supplied by Merck KGaA (refractive index n=1.48 at 500 nm). The most preferred material for LI layers is $SiO_2$ doped with 8% $Al_2O_3$ by weight.

Generally, HI layers and LI layers, have a physical thickness, ranging from 10 to 120 nm (HI) and 10 to 100 nm (LI), respectively.

The antireflecting stack of the present invention may include any layer or stack of layers which improves the anti-reflective properties of the finished optical article over at least one portion of the visible spectrum, thereby increasing the transmission of light and reducing surface reflectance.

Preferably, the multi-layer antireflecting stack comprises, in addition to the innermost and outermost layers, at least one LI layer and at least two HI layers. Preferably, the total number of layers in the anti-reflection coating is ≤9, preferably ≤7.

LI and HI layers are not necessarily alternated in the AR stack, although the anti-reflection coating may comprise an alternated stack of low refractive index and high refractive index layers according to a particular embodiment of the invention. Two or more HI layers may be deposited on one another; two or more LI layers may be deposited on one another.

In general, the total thickness of the antireflecting stack is less than 1.5 μm, preferably 1 μm or less, and even better 0.5 μm or less, and generally ranging from 0.2 to 0.5 μm.

The HI and LI layers are generally applied by vacuum deposition according to one of the following techniques:
1)—by evaporation, optionally ion beam-assisted;
2)—by spraying using an ion beam,
3)—by cathode sputtering; or
4)—by plasma-assisted vapor-phase chemical deposition.

These different methods are described in "Thin Film Processes" and "Thin Film Processes II", Vossen & Kern, Ed., Academic Press, 1978 and 1981, respectively. Said evaporation under vacuum is a particularly recommended method.

These layers can also be applied by applying liquid solutions, preferably by a spin coating process.

The article of the invention may be made antistatic by incorporating at least one electrically conductive layer into the antireflecting stack. The electrically conductive layer may be located in various locations of the antireflecting stack, provided its antireflection properties are not impaired. It is preferably located under a low refractive index layer of the antireflecting stack.

The electrically conductive layer must be thin enough not to impair the transparency of the antireflection coating. Typically, its thickness does vary from 0.1 to 50 nm, more preferably from 0.1 to 30 nm, depending on its nature. When it is less than 0.1 nm thick, it does not typically enable to obtain a sufficient electrical conductivity, on the contrary when it is more than 50 nm thick, it may be difficult to obtain the required transparency and low absorption characteristics.

The electrically conductive layer is preferably made of an electrically conductive and highly transparent material. In that case, its thickness does preferably vary from 0.1 to 30 nm, more preferably from 1 to 20 nm and even more preferably from 1 to 10 nm. The electrically conductive layer preferably comprises a metal oxide selected from indium, tin, and zinc oxide, as well as mixtures thereof. Indium-tin oxide ($In_2O_3$: Sn, i.e. indium oxide doped with tin) and tin oxide ($SnO_2$) are preferred. According to an optimal embodiment, the electrically conductive and optically transparent layer is an indium-tin oxide layer, referred to an ITO layer.

Typically, the electrically conductive layer does contribute to obtain the antireflection properties and form a high refractive index layer in the antireflection coating. That is the case when layers are made of an electrically conductive and highly transparent material such as the ITO layers.

The electrically conductive layer may also be a layer made of a very thin noble metal that is typically less than 1 nm thick, more preferably less than 0.5 nm thick.

The electrically conductive layer, that is typically a high refractive index layer of the antireflection stack, may be deposited according to any suitable method, for example by vacuum deposition, by evaporation, preferably by ion beam assisted deposition (IAD), or by a cathode sputtering or ion beam method.

In a preferred embodiment of the invention, the anti-reflecting coating comprises a partial anti-reflective coating made of a stack of HI and LI layers as disclosed above which is completed by the intermediate layer and the LbL coating of the invention. Then, the intermediate coating and the LbL coating constitutes the outermost or part of the outermost layer of the anti-reflective coating. Typically, this outermost layer of the anti-reflective coating is a low refractive index layer.

As previously mentioned, the intermediate layer composition comprises at least one hydroxylated and aminofunctionalized siloxane oligomer.

As known by the man skilled in the art, an oligomer is a polymer comprising a limited number of repeating molecular units, typically 2 to 50.

The siloxane oligomer used in the intermediate layer composition typically comprises 1 to 50 siloxane

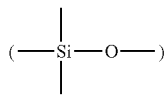

units, preferably from 2 to 20, more preferably 4 to 15 siloxane units.

In the above siloxane unit, the Si atom is linked with at least two monovalent groups, such as an alkyl group, a hydroxyl group, a functionalizing amino group.

Although the siloxane oligomer may be a cyclic or branched oligomer it is preferably a linear oligomer.

Preferably, the functionalizing amino group is a —Z—NH$_2$ group wherein Z represents a divalent group of formula:

-[A-(NH)]$_x$-A'- wherein

A represents —(CH$_2$)$_y$— and A' represents —(CH$_2$)$_z$—
and x is an integer from 0 to 5, preferably from 0 to 3;
y and z are each independently an integer from 1 to 5.

Preferably, the functionalizing amino group is an aminoalkyl group such as an amino methyl, aminoethyl, aminopropyl and aminobutyl group, more preferably an aminopropyl group. Another preferred functionalizing group is —CH$_2$CH$_2$NHCH$_2$CH$_2$NHCH$_2$CH$_2$NH$_2$.

The preferred siloxane oligomers can be represented by formula:

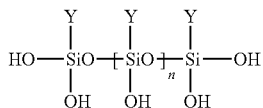

in which Y is independently an amino alkyl group, preferably an amino propyl group, or an alkyl group such as a methyl, ethyl or propyl group, preferably a methyl group and n is an integer from 0 to 18, preferably 2 to 13, with the proviso that at least half of the Y groups are amino alkyl groups.

Examples of preferred hydroxylated and amino functionalized siloxane oligomers are the oligomers of formulae:

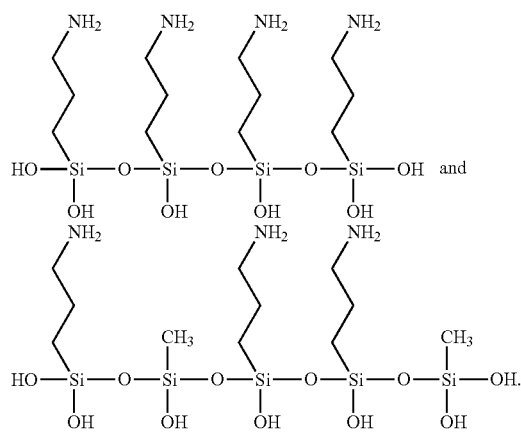

These intermediate coating compositions are preferably stable aqueous composition.

Waterborne siloxane oligomer compositions are commercially available under the trade name Dynasilan® Hydrosil® from Evonik Degussa.

Typically the siloxane oligomers represent 0.1 to 2 wt %, preferably 0.15 to 1.5 wt % of the total weight of the composition.

The intermediate coating composition can be applied by dip coating or spin coating, preferably by dip coating.

During dip coating process, the intermediate coating composition is maintained at a temperature of 20 to 60° C., preferably 30 to 50° C., and the dipping process lasts for several hours, generally at least 3 hours, typically from 3 to 12 hours.

The intermediate layer composition is generally rinsed with water and air dried before application of the LbL coating.

After drying, the thickness of the intermediate layer usually ranges from 1 to 20 nm, preferably 1 to 10 nm.

For convenience in expressing the assembled system, the following notation is commonly used: (polycation/polyanion)$_n$. Polycation and polyanion are the abbreviations of the specific polyelectrolytes used in the LbL assembly and n is the number of bilayers that have been deposited. For example, a ten bilayer assembly comprising carboxymethylcellulose and chitosan is noted as (CMC/CTS)$_{10}$. Sometimes the LbL coating may comprise one additional layer of one of the above disclosed constituents. Therefore, for example a LbL assembly of nine bilayers of CMC and CTC including one additional CMC layer is noted (CMC/CTS)$_{9.5}$.

Although the LbL coating may comprise 1 to 200 bilayers, preferably 2 to 100, more preferably 2 to 50 bilayers, it preferably comprises 4 to 15 bilayers and more preferably 8 to 12 bilayers.

Typically the LbL coating will have a physical thickness ranging from 1 nm to 1 μm, preferably from 1 to 200 nm, more preferably from 50 to 100 nm.

In general, the LbL coating has a refractive index n>1.20, preferably >1.30 and better ≥1.40 and >1.55, preferably >1.52.

As indicated the LbL coating is crosslinked through bondings between NH$_2$ and COOH groups.

Such a crosslinking is classically performed by treatment with a coupling agent inducing chemical bonds between NH$_2$ and COOH groups. Carbodiimide coupling reagents are well known for the formation of amide linkages. Useful carbodiimide-functional compounds have formula:

N(CH$_3$)$_2$—(CH$_2$)$_n$—N═C═N—CH$_2$CH$_3$, wherein n is an integer from 2 to 6. Particularly, preferred compound is the compound with n=3, 1-ethyl-3(-3-dimethylaminopropyl) carbodiimide (EDC). EDC is commercially available from TCI America. Other useful carbodiimides are N,N'-dicyclohexylcarbodiimide and N,N'-diisopropylcarbodiimide.

These carbodiimides are often used in combination with hydroxysuccinimide, sulfo-hydroxysuccinimide or N-hydroxybenzotriazole to increase coupling efficiency and decrease side reactions.

Synthesis of carbodiimides are disclosed by Sheehan, John; Cruishank, Philip, Boshart, Gregory (1961) in "A Convenient Synthesis of Water Soluble Carbodiimides" J. Org. Chem. 26 (7), 2525, and by Nakajima, N; Ikada, Y (1995) in "Mechanism of Amide Formation by Carbodiimide for Bioconjugation in Aqueous Media" Bioconjugate Chem. 6 (1), 123.

A preferred coupling agent is 1-ethyl-3-[3-dimethylaminopropyl]carbodiimide (EDC), combined with N-hydroxysuccinimide (NHS) in a buffered solution.

In preferred embodiments the intermediate layer and the LbL coating are successively deposited on the main surface of the outermost layer of a partial anti-reflective stack of HI and Li layers made of mineral oxides formed by vacuum deposition. In that case the LbL layer constitutes the last layer or part of the last layer, generally a LI layer, of the final antireflecting stack. When the LbL layer constitutes the last layer of the anti-reflective stack, it has generally a physical thickness ranging from 60 to 120 nm, preferably 70 to 100 nm. When the LbL film is part of the last layer of the antireflecting stack, for example forms a composite layer with a SiO$_2$ underlayer (10 to 20 nm thick), it has generally a physical thickness of 60 to 80 nm, preferably 65 to 75 nm.

As examples of partial anti-reflective stacks there can be cited the following stacks, from the innermost to the outermost layer ZrO$_2$/SiO$_2$/ZrO$_2$/SiO$_2$(ZQZQ)

and

ZrO$_2$/SiO$_2$/ZrO$_2$(ZQZ)

In this last stack, the SiO2 layer has been omitted and will be replaced by the LbL coating.

The LbL coatings made by the process of the invention exhibits excellent antifog properties as well good adhesion properties to the substrate. In particular, they can withstand wet wiping.

The present invention will now be described with reference to the following examples:

EXAMPLES

1. Testing Methods

The following test procedures were used to evaluate the optical articles according to the present invention.

a) Fog Test According to EN 168 Standard

The antifog properties were evaluated by an apparatus slightly modified from European Standard Test (EN168). The ambient temperature during the measurement is 23±5° C. The temperature of the water bath is set at 50±0.5° C. The air above the water bath is circulated using a ventilator, so that it becomes saturated with water vapor. During this time, the measurement opening is to be covered. The ventilator is switched off before measurement. The samples must be placed in the test position within 2 s of the opening being uncovered.

To measure the transmittance change, the sample is placed on the seating ring, with one side exposed to the water vapor and the upper side exposed to the air. The relative transmittance (T$_r$) is recorded as T$_r$%=(T$_f$/T$_i$)*100=(I$_f$/I$_i$)*100, where the initial transmittance (T$_i$) is determined by laser intensity (I$_i$) passing through the sample in the non-fogging conditions, and the transmittance (T$_f$) is determined by laser intensity (I$_f$) passing through the sample during the fogging condition. The measurement spectrum shows the change of T$_r$ during a measurement time from 0 to 120 s.

Two T$_r$ data at 60 s and 120 s of each sample are listed in the table for sample comparison.

As a comparison and reference, a classical AR stack on an Orma® lens exhibits the following results: 5% T$_r$ at 60 s and 7% at 120 s.

This reference lens is a commercial lens comprising an ORMA® substrate coated on both sides by an abrasion resistant coating as defined below in point "preparation of the substrate" on which have been formed by vacuum deposition, starting from the substrate, an anti-reflective stack comprising 4 layers: a first ZrO$_2$ layer (27 nm), a second SiO$_2$ layer (21 nm), a third ZrO$_2$ layer (80 nm) and a fourth SiO$_2$ layer (81 nm), and, on top of the anti-reflective stack, an antisoiling coating by evaporation under vacuum of OPTOOL DSX® marketed by DAIKIN INDUSTRIES (thickness: from 2 to 5 nm).

b) Haze Value, Rv and Thickness

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged.

The mean reflectance factor Rv is such as defined in ISO standard 13666:1998 and measured in accordance with ISO standard 8980-4, i.e. it is the balanced average spectral reflection in the visible spectrum in the wavelengths limits ranging from 380 nm to 780 nm.

The thickness of the films prepared on frosted glass was evaluated by ellipsometer (thickness <1 μm) equipped with M-44TM, EC-270 and LPS-400 with 75 W Xenon Light Source from J. A. Woollam Co. Inc., or the thickness of the layers and films coated on lenses was measured by with a Metricon Model 2010 Prism Coupler apparatus (thickness >1 μm) from Metricon Corporation.

c) Adhesion (Wet Rubbing Test)

A weight of 725 g head with a water dampened micro-fiber cloth (immersed in the deionized (DI) water before use) is applied on a convex side of a lens surface. The lens is rubbed for 500 strokes, air dried and then checked if the AR coating is damaged (one stroke: one forward and backward motion). There are four levels of adhesion after the rubbing test, determined by scratch numbers observed in a square of 100 μm×100 μm micro-photograph of the rubbed surfaces (magnification 5× or 10×).

Each adhesion level is the average result of three inspection spots on one sample.

| Adhesion | |
|---|---|
| Excellent: No scratches | Middle: Many scratches |
| Good: Few scratches | Bad: Removal of the coating |

2. Preparation of the Substrate

In all examples the optical articles were round lenses (plano or −2.00 with a diameter of 68 mm) comprising an ORMA® lens substrate (obtained by polymerizing CR-39® diethylene glycol bis((allyl carbonate) monomer), coated on both faces with a power of −2.00 dioptres and a thickness of 1.2 mm, coated on both faces with an abrasion-resistant and/or an antiscratch coating (hard coat) disclosed in example 3 of the patent EP 0614957 (refractive index 1.50, thickness 3.5 nm), based on a hydrolysate of GLYMO and DMDES, with colloidal silica and aluminum acetyl acetonate.

More precisely, the abrasion-resistant coating (hardcoat) was obtained by depositing and curing of a composition comprising by weight, 224 parts of GLYMO, 80.5 parts of HCl 0.1 N, 120 parts of DMDES, 718 parts of a 30 weight % colloidal silica in methanol, 15 parts of aluminum acetyl acetonate and 44 parts of ethylcellulose. The composition also comprised 0.1% of the surfactant FLUORAD™ FC-430® (3M) by weight as related to the total weight of the composition. This abrasion-resistant coating was deposited directly onto the substrate.

ZQZQ lens: An Orma® lens dip-coated with a 3.5 μm hard coat as above is coated by vacuum deposition with four inorganic oxide layers in the indicated order (zirconia 26 nm/silica 22 nm/zirconia 88 nm/silica 13 nm).

ZQZ lens: An Orma® lens dip-coated with 3.5 μm hard coat as above is coated by vacuum deposited with three inorganic oxide stacks (zirconia 26 nm/silica 22 nm/zirconia 87 nm).

Silica coated lens: An Orma® lens dip-coated with 3.5 μm hard coat as above is coated by vacuum deposition with one silica layer (80 nm).

3. Experimental Details

A layer-by-layer coating is applied onto both sides of a substrate according to the general process described below:

I. Surface cleaning: A lens substrate is first dipped in an ultrasonic caustic solution, and then rinsed in ultrasonic DI water and air dried.

II. Surface pre-treatment: In some cases, the lens is dipped in an adhesive solution, and then rinsed in ultrasonic DI water and air dried.

III. Coating process: The treated lens is dipped in a polyanion solution, followed with a rinsing step in two agitated DI water baths; and then dipped in a polycation solution, followed with a rinsing step in two agitated DI water baths. This process is repeated for (n−1) times and then air dried for 20-30 minutes to get a coating with n bilayers of (polyanion/polycation), written as (polyanion/polycation)$_n$. In some cases, the process is further deposited with polyanion as the outermost layer to get (polyanion/polycation)$_{n+0.5}$ coating.

IV. Post-treatment: The coating is cross-linked in a fresh coupling agent solution, then rinsed in an ultrasonic solution and air dried.

Name and conditions of chemicals used here:

Polycation: chitosan (CTS, low molecular weight, used at 0.1 wt % in water added with 0.2 wt % of acetic acid for solubility improvement, pH=4.0) and ApSiO$_2$ (Aminopropyl functionalized silica nanoparticles) (15 nm, 3.0 w/v % in ethanol, used at 0.005 wt % in water, pH=3.5) purchased from Sigma-Aldrich Polyanion: sodium carboxymethyl cellulose purchased from Sigma-Aldrich (CMC, Mw=250,000, used at 0.1 wt % in water, pH=4.0), polyacrylic acid purchased from Polysciences, Inc (PAA, used as 0.01M in water, pH=3.5)

Adhesive (intermediate layer): Amino functional siloxane oligomer (Dynasilan® Hydrosil® 2775, 2627 and 1151) used at 0.15-1.5 wt %

| Dynasylan® Hydrosil® products | Functionality | pH | Initial solid (wt %) | Diluted solution (wt %) |
|---|---|---|---|---|
| 1151 | Amino | 10-12 | 21 | 1.1 |
| 2627 | Amino/alkyl | 10-11 | 20 | 1.0 |
| 2775 | Triamino | 10-11 | 30 | 0.15 or 1.5 |

Crosslinking agent: 1-Ethyl-3-[3-dimethylaminopropyl] carbodiimide hydrochloride (EDC) purchased from TCI America, N-hydroxysuccinimide (NHS) purchased from Alfa Aesar.

Buffer solutions: 2-(N-Morpholino)ethanesulfonic acid (MES, 0.05M) and Phosphate buffered saline (PBS, 1×) purchased from Sigma-Aldrich.

Examples C1-1, C1-2 and Comparative Example CE1

A partial anti-reflective AR stack coated lens (ZQZQ) substrate was first dipped in an ultrasonic caustic solution (1 wt % of NaOH) for 5 min, and then rinsed in ultrasonic DI water for 5 min and air dried. The lens was then dipped in a 0.15 or 1.5 wt % of Hydrosil® 2775 aqueous solution at 40-50° C. for 3 h or 12 h, and then rinsed in ultrasonic DI water for 5 min and air dried. In the LbL coating process, the treated lens was dipped in 0.1 wt % of CMC solution for 5 min, followed with a rinsing step in two agitated DI water baths (2 min per bath); and then dipped in 0.1 wt % of CTS solution (added with 0.2 wt % of acetic acid) for 5 min, followed with a rinsing step in two agitated DI water baths (2 min per bath). The agitation speed is ~100 rpm. This process was repeated for another 9 times and the obtained lens was air dried to get a coating (CMC/CTS)$_{10}$. The coating was then dipped in a crosslinker aqueous solution 0.2M EDC and 0.05M NHS in the presence of 0.05M MES buffer at pH 5.0 for 1 h, then rinsed in an ultrasonic PBS solution and air dried.

In a comparison example (CE1), example 1 was reproduced on a ZQZQ lens except that the step of treating with the adhesive intermediate layer was omitted (only NaOH pretreatment applied) and that the crosslinked LbL coating was (CTS/CMC)$_{11}$ (The CTS layer was first deposited on the lens surface due to negative charges on NaOH treated surface). The thickness of the LbL coatings is in the range of 70-90 nm.

| Sample | Adhesive coating | Rv, % of Cc side | Haze, % | EN 168 Tr % 1 min | 2 min | Adhesion (wet rubbing test) |
|---|---|---|---|---|---|---|
| CE1 | / | 0.33 | 0.87 | 83 | 85 | Bad |
| C1-1 | 2775, 1.5 wt %, 3 h | 1.04 | 0.88 | 87 | 84 | Excellent |

-continued

| Sample | Adhesive coating | Rv, % of Cc side | Haze, % | EN 168 Tr % 1 min | EN 168 Tr % 2 min | Adhesion (wet rubbing test) |
|---|---|---|---|---|---|---|
| C1-2 | 2775, 0.15 wt %, 12 h | 0.98 | 0.63 | 89 | 91 | Excellent |

Examples C2-1, C2-2; C2-3 and Comparative Example CE2

A partial anti-reflective AR stack coated lens ZQZ lens was first dipped in an ultrasonic caustic solution (1 wt %) for 5 min, and then rinsed in ultrasonic DI water for 5 min and air dried. The lens was then dipped in a diluted Hydrosil® 1151, 2627 or 2775 aqueous solution at 40-50° C. for 3 h and then rinsed in ultrasonic DI water for 5 min and air dried. The following experiment procedure was same as Example C1-1 except that the LbL coating was $(CMC/CTS)_{11.5}$. The crosslinking process is the same as example C1-1.

In comparison example (CE2), example C2-1 was reproduced except that the crosslinked LbL coating was $(CTS/CMC)_{12.5}$ prepared on a ZQZ lens (The CTS layer was first deposited on the lens surface) and that the step of treating with the adhesive intermediate layer was omitted (only NaOH pre-treatment applied) The thickness of the LbL coatings is in the range of 80-100 nm.

| Sample | Adhesive coating | Rv, % of Cc side | Haze, % | EN 168 Tr % 1 min | EN 168 Tr % 2 min | Adhesion (wet rubbing test) |
|---|---|---|---|---|---|---|
| CE2 | / | 0.94 | 1.02 | 92 | 91 | Bad |
| C2-1 | 1151, 1.1 wt %, 3 h | 1.07 | 1.41 | 89 | 85 | Good |
| C2-2 | 2627, 1.0 wt %, 3 h | 1.34 | 0.85 | 98 | 100 | Good |
| C2-3 | 2775, 1.5 wt %, 3 h | 1.55 | 1.20 | 87 | 88 | Excellent |

Examples C3-1, C3-2 and Comparative Examples CE3-1 and CE3-2

The procedure of making antifog LbL coating was the same as Example C1-1 except that the AR coated lens was replaced by a glass lens (refractive index 1.50) and a silica-coated lens. 1.5 wt % of Hydrosil® 2775 was used before applying the LbL coating. The LbL coatings were crosslinked $(CMC/CTS)_{12.5}$ on substrates treated with Hydrosil® 2775 (C3-1, C3-2) and a coating $(CTS/CMC)_{12.5}$ was applied on each non treated (CE3-1, CE3-2) substrate as comparison example. The thickness of the LbL coatings is in the range of 80-100 nm.

| Substrate | Sample | Adhesive coating | Haze, % | EN 168 Tr % 1 min | EN 168 Tr % 2 min | Adhesion (wet rubbing test) |
|---|---|---|---|---|---|---|
| Silica coated lens | CE3-1 | / | 0.77 | 94 | 95 | Bad |
| | C3-1 | 2775, 3 h | 0.59 | 95 | 95 | Excellent |
| Glass lens | CE3-2 | / | 0.64 | 99 | 98 | Bad |
| | C3-2 | 2775, 3 h | 0.91 | 94 | 92 | Excellent |

Example C4 and Comparative Example CE4

As in Example C2-3, a ZQZ lens was first treated with NaOH and grafted with Hydrosil® 2775. In the LbL coating process, the pH of all solutions were titrated to 3.5. The lens was dipped in 0.01M of PAA solution for 2 min, followed by rinsing in two agitated DI water baths (1 min per bath); and then dipped in 0.05 wt % of ApSiO2 solution for 2 min, followed by rinsing in two agitated DI water baths (1 min per bath). The agitation speed is ~100 rpm. This process was repeated for another 8 times and then air dried to get a coating with $(PAA/ApSiO2)_9$. The coating was then dipped in a crosslinker aqueous solution (0.2M EDC and 0.05M NHS in the presence of 0.05M MES buffer at pH 5.0) for 1 h, then rinsed in an ultrasonic PBS solution and air dried. A comparison example (CE4) was prepared on ZQZ by reproducing example C4, except that the intermediate adhesive layer was omitted (there was only NaOH pretreatment) and that the crosslinked coating was $(ApSiO2/PAA)_{9.5}$ (The ApSiO$_2$ layer was first deposited on the lens surface).

| Sample | Adhesive coating | Rv, % of Cc side | Haze, % | EN 168 Tr % 1 min | EN 168 Tr % 2 min | Adhesion |
|---|---|---|---|---|---|---|
| CE4 | / | 0.54 | 0.95 | 84 | 86 | Bad |
| C4 | 2775, 3 h | 0.81 | 1.57 | 81 | 80 | Excellent |

Examples C5-1 and C5-2

A partial AR stack coated lens (ZQZQ or ZQZ) substrate was first dipped in an ultrasonic caustic solution (0.5 wt % of NaOH) for 5 min, and then rinsed in ultrasonic DI water for 5 min and air dried. The lens was then dipped in a 1.5 wt % of Hydrosil® 2775 aqueous solution at 40-50° C. for 3 h, and then rinsed in ultrasonic DI water for 5 min and air dried. In the LbL coating process, the treated lens was dipped in 0.1 wt % of circulated filtered CMC solution (5 μm filter membrane) for 3 min, followed with a rinsing step in one circulated filtered DI water bath for 3 min; and then dipped in 0.1 wt % of circulated filtered CTS solution containing 0.2 wt % of acetic acid for 3 min, followed with a rinsing step in one circulated filtered DI water bath for 3 min. This process was repeated for another 7 times and then air dried to get a coating with $(CMC/CTS)_8$ on ZQZQ; or the process was repeated for 8 times plus a layer of CMC as the outermost layer, and then air dried to get a coating with $(CMC/CTS)_{9.5}$ on ZQZ. The coating was then dipped in a crosslinker aqueous solution (0.2M EDC and 0.05M NHS in the presence of 0.05M MES buffer, pH adjusted to 5.0) for 1 h, then rinsed in an ultrasonic PBS solution and air dried.

| Sample | Substrate | LbL coatings | Rv, % of Cx side | Haze, % | EN 168 Tr % 1 min | EN 168 Tr % 2 min | Adhesion |
|---|---|---|---|---|---|---|---|
| C5-1 | ZQZQ | $(CMC/CTS)_8$ | 0.27 | 0.14 | 65 | 69 | Excellent |
| C5-2 | ZQZ | $(CMC/CTS)_{9.5}$ | 0.54 | 0.25 | 72 | 67 | Excellent |

The examples show that the antifog antireflecting lenses according to the invention exhibit good antifog properties as well as good adhesion properties of the antifog LbL layers to the lens substrates.

In the absence of the adhesive intermediate layer, the LbL coatings exhibit poor adhesion properties to the lens substrates.

Comparative Examples CE6-1 to CE6-7

Two types of cyclic ozasilane, 2,2-dimethoxy-1,6-diaza-2-silacyclooctane (DDS) and N-methylaza-2,2,4-trimethylsila-cyclo-pentane (MATS) are used for forming the adhesive intermediate layer. These compounds are known to react with OH groups by opening of the cycles:

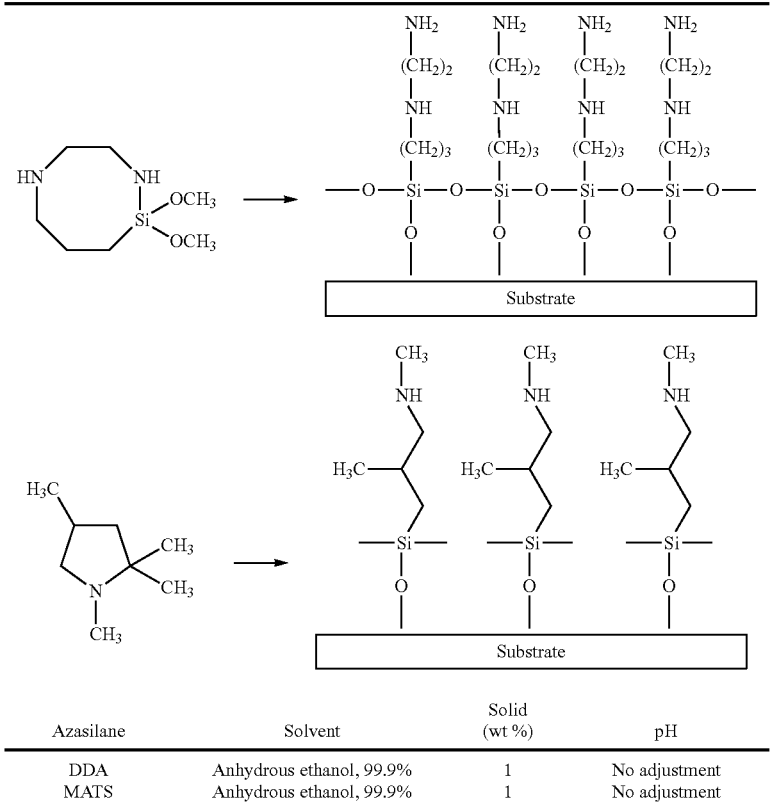

| Azasilane | Solvent | Solid (wt %) | pH |
|---|---|---|---|
| DDA | Anhydrous ethanol, 99.9% | 1 | No adjustment |
| MATS | Anhydrous ethanol, 99.9% | 1 | No adjustment |

A partial AR stack coated lens (ZQZQ or ZQZ) substrate was first dipped in an ultrasonic caustic solution (0.5 wt % of NaOH) for 5 min, and then rinsed in ultrasonic DI water for 5 min and air dried; or the substrate was treated with air or oxygen plasma for 30 s. The lens was then dipped in a 1.0 wt % of DDA or MATS anhydrous ethanol solution at room temperature for 10 min to 1 h, and then rinsed in anhydrous ethanol for 5 min and air dried. Since azasilane is sensitive to humidity, this step was conducted in the nitrogen purged dry box (relative humidity <15%).

In the LbL coating process, the treated lens was dipped in 0.1 wt % of circulated filtered CMC solution (5 μm filter membrane) for 3 min, followed with a rinsing step in one circulated filtered DI water both for 3 min; and then dipped in 0.1 wt % of circulated filtered CTS solution containing 0.2 wt % of acetic acid for 3 min, followed with a rinsing step in one circulated filtered DI water bath for 3 min. This process was repeated for another 7 times and then air dried to get a coating $(CMC/CTS)_8$ on ZQZQ; or the process was repeated for 8 times plus a layer of CMC as the outermost layer, and then air dried to get a coating $(CMC/CTS)_{9.5}$ on ZQZ. The coating was then dipped in a crosslinker aqueous solution (0.2M EDC and 0.05M NHS in the presence of 0.05M MES buffer, pH adjusted to 5.0) for 1 h, then rinsed in an ultrasonic PBS solution and air dried.

| Sample | Surface treatment | Adhesion coating | Time (min) | Rv, % of Cx side | Haze % | EN 168 Tr % 1 mn | 2 mn | Adhesion (wet rubbing test) |
|---|---|---|---|---|---|---|---|---|
| On ZQZQ lens, $(CMC/CTS)_8$ coating was assembled and crosslinked |||||||||
| CE6-1 | NaOH | DDS | 30 | 1.88 | 0.48 | 42 | 41 | Middle |
| CE6-2 | NaOH | MATS | 30 | 2.23 | 0.59 | 16 | 15 | Bad |
| On ZQZ lens, $(CMC/CTS)_{9.5}$ coating was assembled and crosslinked |||||||||
| CE6-3 | NaOH | DDS | 10 | 0.63 | 0.23 | 47 | 45 | Middle |
| CE6-4 | NaOH | DDS | 30 | 0.59 | 0.21 | 44 | 48 | Excellent |
| CE6-5 | Plasma | DDS | 30 | 0.56 | 0.20 | 49 | 46 | Excellent |

-continued

| Sample | Surface treatment | Adhesion coating | Time (min) | Rv, % of Cx side | Haze % | EN 168 Tr % 1 mn | 2 mn | Adhesion (wet rubbing test) |
|---|---|---|---|---|---|---|---|---|
| CE6-6 | Plasma | DDS | 60 | 0.99 | 0.28 | 40 | 36 | Excellent |
| CE6-7 | NaOH | MATS | 30 | 2.51 | 0.45 | 26 | 30 | Middle |

The results show that these compounds greatly degrade the antifog properties of LbL coating, although they may provide good adhesion of the LbL coating to the substrate.

The invention claimed is:

1. A process for making a transparent optical article having anti-fog properties comprising:
   (a) providing a substrate having at least one main surface bearing hydroxyl groups coated with an intermediate layer obtained by applying on the main surface of the substrate an intermediate layer composition comprising, as a starting ingredient at least one hydroxylated and amino-functionalized siloxane oligomer; and
   (b) forming on the intermediate layer an anti-fog layer-by-layer (LbL) coating consisting of at least two bilayers obtained by:
      (i) forming a first layer on the intermediate layer by applying a first composition comprising a polyelectrolyte obtained from carboxyalkyl cellulose or a polyelectrolyte further defined as comprising polyacrylic acid (PAA), poly(methacrylic acid) (PMAA), PAA copolymer, or PMAA copolymer;
      (ii) forming a second layer on the first layer by applying a second composition comprising a polyelectrolyte obtained from polysaccharide including glucosamine units when the first layer comprises the polyelectrolyte obtained from carboxyalkyl cellulose or metal oxide or silicon oxide nanoparticles which are surface functionalized with amino groups when the first layer comprises the polyelectrolyte obtained from polyacrylic acid, poly(methacrylic acid), PAA copolymer or PMAA copolymer; and
      (iii) crosslinking the layers of the LbL coating by treatment with a composition of a coupling agent inducing chemical linkages between $NH_2$ and COOH groups, includes exactly three amino functional groups.

2. The process of claim 1, further defined as comprising repeating at least once steps (b)(i) and (b)(ii) before crosslinking the layers of the LbL coating in step (b)(iii).

3. The process of claim 1, wherein in step (b) the first composition comprises polyacrylic acid.

4. The process of claim 1, wherein the hydroxylated and amino-functionalized siloxane oligomer is linear and comprises from 1 to 50 siloxane units.

5. The process of claim 4, wherein the hydroxylated and amino-functionalized siloxane oligomer is linear and comprises from 2 to 20 siloxane units.

6. The process of claim 1, wherein the intermediate layer composition is an aqueous solution.

7. The process of claim 6, wherein the siloxane oligomer represents 0.1 to 2 wt % of the total weight of the intermediate layer composition.

8. The process of claim 7, wherein the intermediate layer composition is applied by dipping the substrate in the intermediate layer composition at a temperature of 30 to 50° C. for 3 to 12 hours.

9. The process of claim 1, wherein the carboxyalkyl cellulose is carboxymethyl cellulose, the polysaccharide is chitosan, and the surface functionalized silicon oxide nanoparticles are silicon oxide nanoparticles functionalized with aminopropyl groups.

10. The process of claim 1, wherein the coupling agent is a carbodiimide-functional compound of formula:

$$N(CH_3)_2-(CH_2)_n-N=C=N-CH_2CH_3,$$

wherein n is an integer from 2 to 6.

11. The process of claim 10, wherein the coupling agent is the compound wherein n=3.

12. The process of claim 10, wherein the coupling agent further comprises hydroxysuccinimide, sulfo-hydroxysuccinimide or N-hydroxybenzotriazole.

13. The process of claim 1, wherein the substrate comprises an anti-abrasion and/or anti-scratch coating, and the intermediate layer and the LbL coating are successively formed on the anti-abrasion and/or anti-scratch coating.

14. The process of claim 1, wherein the substrate comprises an anti-reflective coating or a partial anti-reflective coating, and the intermediate layer and the LbL coating are successively formed on the anti-reflective or partial anti-reflective coating.

15. The process of claim 1, wherein the optical article is an ophthalmic lens.

16. The process of claim 1, wherein the first layer comprises the polyelectrolyte obtained from carboxyalkyl cellulose and the second layer comprises the polyelectrolyte obtained from polysaccharide including glucosamine units.

17. The process of claim 1, wherein the first layer comprises the polyelectrolyte obtained from polyacrylic acid, poly(methacrylic acid), PAA copolymer, or PMAA copolymer and the second layer comprises the polyelectrolyte obtained from metal oxide or silicon oxide nanoparticles which are surface functionalized with amino groups.

18. A process according to claim 1, wherein the hydroxylated and amino-functionalized siloxane oligomer has the formula:

$$HO-\underset{\underset{OH}{|}}{Si}-O-\underset{\underset{OH}{\overset{CH_3}{|}}}{Si}-O-\underset{\underset{OH}{|}}{\overset{\overset{NH_2}{\wedge\wedge\wedge}}{Si}}-O-\underset{\underset{OH}{|}}{\overset{\overset{NH_2}{\wedge\wedge\wedge}}{Si}}-O-\underset{\underset{OH}{\overset{CH_3}{|}}}{\overset{\overset{NH_2}{\wedge\wedge\wedge}}{Si}}-OH.$$

19. A process according to claim 1, wherein the substrate is made of organic substrate.

20. A process according to claim 18, wherein the organic substrate is selected from polycarbonates (PC) and diethylene glycol bis(allylcarbonate) polymers.

21. A process for making an optical article having anti-fog properties comprising:
   (a) providing a substrate having at least one main surface bearing hydroxyl groups coated with an intermediate layer obtained by applying on the main surface of the substrate an intermediate layer composition comprising at least one hydroxylated and amino-functionalized siloxane oligomer; and (b) forming on the intermediate layer an anti-fog layer-by-layer (LbL) coating consisting of at least two bilayers obtained by:
  (i) forming a first layer on the intermediate layer by applying a first composition comprising a polyelectrolyte obtained from carboxyalkyl cellulose or a polyelectrolyte further defined as comprising polyacrylic acid (PAA), poly(methacrylic acid) (PMAA), PAA copolymer, or PMAA copolymer;
  (ii) forming a second layer on the first layer by applying a second composition comprising a polyelectrolyte obtained from polysaccharide including glucosamine units when the first layer comprises the polyelectrolyte obtained from carboxyalkyl cellulose or metal oxide or silicon oxide nanoparticles which are surface functionalized with amino groups when the first layer comprises the polyelectrolyte obtained from polyacrylic acid, poly(methacrylic acid), PAA copolymer or PMAA copolymer; and
  (iii) crosslinking the layers of the LbL coating by treatment with a composition of a coupling agent inducing chemical linkages between $NH_2$ and COOH groups,
wherein the siloxane oligomer of step (a) has a ratio of amino functional groups to Si atoms of 3:5.

* * * * *

UNITED STATES PATENT AND TRADEMARK OFFICE
CERTIFICATE OF CORRECTION

| | | |
|---|---|---|
| PATENT NO. | : 9,011,970 B2 | Page 1 of 1 |
| APPLICATION NO. | : 12/847808 | |
| DATED | : April 21, 2015 | |
| INVENTOR(S) | : Haipeng Zheng et al. | |

It is certified that error appears in the above-identified patent and that said Letters Patent is hereby corrected as shown below:

Title page,

<u>Item (73) Assignee:</u>

Delete "Essilor International" replace with -- Essilor International (Compagnie Generale D'Optique) --.

In the claims,

<u>Claim 1, Column 17, Line 21:</u>

Delete "starting ingredient at least" and replace with -- starting ingredient, at least --.

<u>Claim 1, Column 17, line 44:</u>

Delete "groups, includes exactly" and replace with -- groups, wherein the siloxane oligomer of step (a) includes exactly --.

<u>Claim 20, Column 18, Line 61:</u>

Delete "according to claim 18" and replace with -- according to claim 19 --.

Signed and Sealed this
Ninth Day of February, 2016

Michelle K. Lee
*Director of the United States Patent and Trademark Office*